No. 762,064. PATENTED JUNE 7, 1904.
I. F. KEPLER.
PROCESS OF MAKING HOLLOW RUBBER BULBS OR OTHER ARTICLES HAVING NECKS OR PROJECTIONS.
APPLICATION FILED AUG. 31, 1903.
NO MODEL.

WITNESSES:
INVENTOR
Irwin Floyd Kepler
BY
Seward Davis
ATTORNEY

No. 762,064.

Patented June 7, 1904.

UNITED STATES PATENT OFFICE.

IRWIN FLOYD KEPLER, OF AKRON, OHIO, ASSIGNOR TO THE B. F. GOODRICH COMPANY, OF OHIO, OF AKRON, OHIO, A CORPORATION OF OHIO.

PROCESS OF MAKING HOLLOW RUBBER BULBS OR OTHER ARTICLES HAVING NECKS OR PROJECTIONS.

SPECIFICATION forming part of Letters Patent No. 762,064, dated June 7, 1904.

Application filed August 31, 1903. Serial No. 171,379. (No model.)

*To all whom it may concern:*

Be it known that I, IRWIN FLOYD KEPLER, a citizen of the United States of America, and a resident of the city of Akron, county of Summit, and State of Ohio, have invented certain new and useful Improvements in Processes of Making Hollow Rubber Bulbs or other Articles Having Necks or Projections, of which the following is a specification.

This invention relates to an improved process of making hollow rubber bulbs or analogous articles having necks, projections, or thickened portions receiving pipe or other connections.

The invention has for its more especial object to provide for reinforcing the necks, projections, or thickened portions of a hollow rubber bulb or other article produced by cutting a double-walled blank from uncured rubber tubing, then joining the edges of the blank by pressure, and then vulcanizing the edge-joined blank.

My prior patent application, having Serial No. 148,621, filed March 19, 1903, shows, describes, and generically claims a method of producing balls, bulbs, or other hollow rubber articles by cutting a double-walled blank from rubber-compound tubing and integrally joining said walls at the margin of the blank by pressure, which preferably is that of suitably-formed portions of the cutting-die prior to formatively expanding the edge-joined blank to the walls of a mold during the process of vulcanization. This invention differs from said prior generic invention by providing for cutting the rubber blank from rubber-compound tubing having one or more longitudinal reinforcing ribs or flanges which, as the bulb-blank is cut from the ribbed tubing, provide a reinforce or filling for one or more necks, projections, or thickened portions formed on the blank and leave the necks, projections, or thickened portions ready to be bored out to receive pipe or other necessary connections after the bulb or article has been vulcanized.

The invention will first be described and then will be particularly defined in claims hereinafter set forth.

Reference is made to the accompanying drawings, forming part of this specification, in which—

Figure 1:
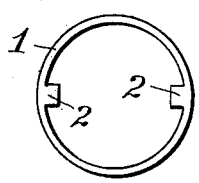
Figure 2:
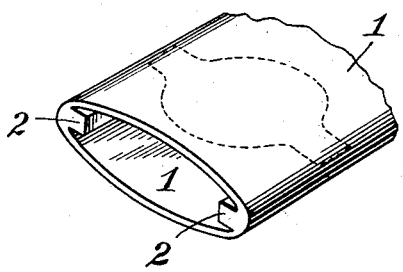
Figure 3:
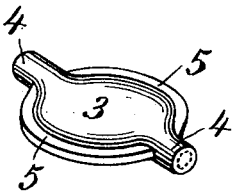
Figure 4:
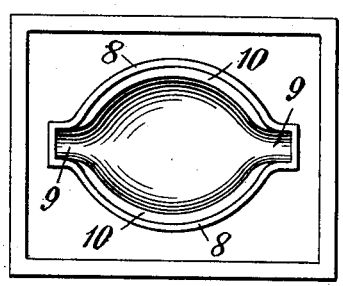
Figure 6:
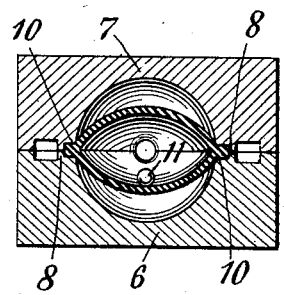
Figure 7:
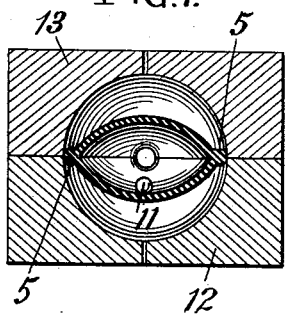

Figure 1 is an end view of a rubber-compound tube having two interior reinforcing ribs or parts. Fig. 2 is a perspective view of a piece of this tubing flattened preparatory to cutting from it the double-necked bulb-blank shown in Fig. 3, the method of cutting this blank being indicated by its dotted outline on the tubing of Fig. 2. Fig. 4 is a plan view of one of two similar halves of the bulb-blank-cutting and edge-joining die, both halves of which are shown in longitudinal section in Fig. 5 and in transverse section in Fig. 6, with the formed blank between them and with the gas or vapor generating capsule within the blank. Fig. 7 shows in cross-section the mold in which the cut and edge-pressed bulb-blank is vulcanized and with the unexpanded blank therein; and Figs. 8 and 9, respectively, are transverse and longitudinal sections of the mold with the bulb fully expanded to its walls after vulcanization. Fig. 10 is a perspective view of modified rubber tubing having but one longitudinal rib or reinforce and adapted for forming the bulb-blank of Fig. 11, which has but one pipe-connecting neck.

To practice my invention, when the product is to be a bulb or article having an outwardly-projecting neck at each end I use homogeneous rubber-compound tubing 1, which preferably has been drawn through mandrel-dies shaped to leave opposite reinforcing ribs or flanges 2 2 on the interior of the tubing, as shown in Fig. 1 of the drawings. This ribbed or reinforced tubing while flattened, as shown in Fig. 2, is acted upon by cutting and edge-pressing dies shown in Figs. 4, 5, and 6 of the drawings to produce the double-walled bulb-blank 3, having opposite end necks 4 4 and opposite joined side edges 5 5, as shown in Fig. 3 of the drawings. This tubing is placed between the die-sections 6 7 in manner causing the bulb-blank necks 4 to be formed solidly from those opposite edge portions of the flattened tubing in which the reinforcing-ribs 2 2 lie and as will be understood from the dotted outline of the blank on the tubing in Fig. 2 of the drawings.

Figure 5:
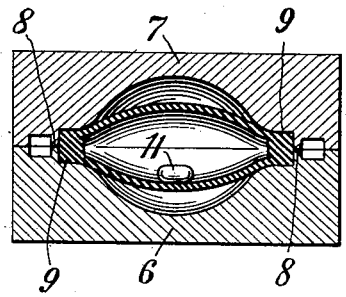

The cutting-die sections 6 7 are similarly shaped with cutting edges 8, which marginally shape the blank, end concavities 9 9, which shape the blank-necks 4 4, and opposite side recesses 10 10, which compress and intimately or integrally unite the blank edges 5 5 as the blank is marginally cut from the ribbed tubing 1 by the die edges 8. Before thus die-cutting and edge-joining the blank I prefer to place within the ribbed tubing 1 a capsule 11, of ammoniacal fluid or other gas or vapor generating substance, which thus will be confined within the formed blank, as shown in Figs. 5, 6, and 7 of the drawings.

Figure 8:
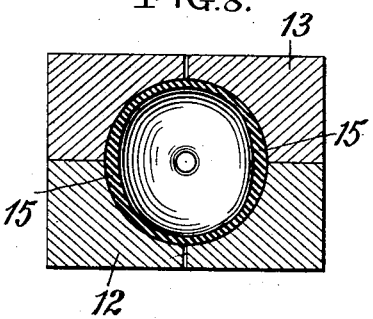
Figure 9:
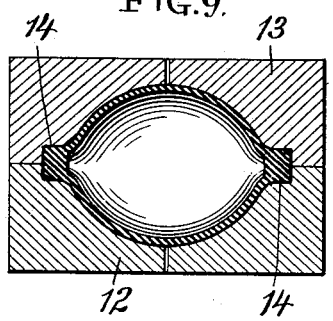
Figures 10, 11:
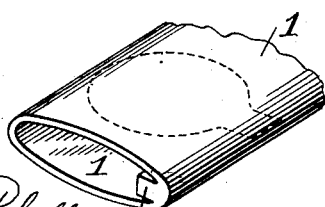

After the capsule-charged blank 3 4 5 is formed from the specially-reinforced tubing 1 2 by the cutting-die 6 7 the blank is placed in a suitable mold having sections 12 13 and shown in Figs. 7, 8, and 9 of the drawings. This mold has concavities 14 14, receiving the blank-necks 4 4, and the mold-walls are otherwise shaped to give any desired contour to the body portion of the bulb, the usual rounded form being illustrated in Figs. 8 and 9 of the drawings, which show the bulb fully expanded within the mold by the process of vulcanization. The increased thickness of the blank's compressed edges 5 5, as shown in Fig. 7 of the drawings, when the blank is first placed in the mold becomes the increased thickness of the compressed and homogeneously-united walls of the fully-expanded vulcanized bulb-body at opposite sides 15 15, as shown in Fig. 8 of the drawings.

After the bulb is vulcanized, as above described, its solid necks 4 4 are bored out, as indicated by the dotted lines in Figs. 3 and 11 of the drawings, in readiness for connection of pipes, nozzles, or other adjuncts, when the bulb is incorporated into a syringe, atomizer, or other finished product.

In producing the single-necked bulb-blank and bulb the cutting-die will be correspondingly shaped to form the integrally-joined edge 5 of the two opposite blank-walls all around the blank except at its neck 4, and this blank then will be vulcanized in a suitably-shaped mold, as will readily be understood.

There is a marked advantage in producing a necked bulb or analogous article from rubber-compound tubing having one or more reinforcing ribs or portions as compared with the process of forming such bulbs or articles from the plain unribbed or unreinforced rubber-compound tubing shown and described in my concurrent patent application, Serial No. 148,621. The use of the ribbed or specially-reinforced tubing obviates uncertainty as regards sufficiency of material to form full, solid, and strong necks on the bulb, as ample material always is provided for this purpose by the reinforced portions of the tubing, thus making unnecessary the insertion of separately-formed plugs or other reinforcement at neck portions of the uncured bulb and also increasing the strength of the necks and bulb-body, thereby assuring more secure connection of pipes or other necessary adjuncts to the finished bulb, which as a whole is stronger and more durable in use.

As regards the herein-described process, it is immaterial whether the bulb or other hollow rubber article have one or more necks projecting outwardly or inwardly to receive pipe or other connections or whether the bulb have simply increased wall thickness or rubber compound where such connections are to be made, the particular form of these reinforced portions of the bulb or article depending largely on the character of the connections and the particular use of the bulb in any special finished product. It will therefore be obvious that the particular location and cross-sectional form of the rubber-compound reinforcement of the tubing depend largely upon the character of the bulb or article to be formed and its special use, it being immaterial whether this reinforcement be provided along the interior or exterior of the uncured rubber-compound tubing from which the bulbs or like articles are produced in accordance with this invention.

I claim as my invention—

1. The herein-described process of making hollow rubber bulbs or other articles having necks, projections or thickened portions, which consists in cutting a double-walled blank from uncured rubber tubing having reinforcement at places forming said bulb-necks, projections or thickened portions, then pressing marginal portions of said blank into homogeneity, and then vulcanizing the blank, substantially as specified.

2. The herein-described process of making hollow rubber bulbs or other articles having necks, projections or thickened portions, which consists in placing a gas or vapor generating substance within uncured rubber tubing having reinforcement at places forming said bulb-necks, projections or thickened portions, then cutting from said tubing a double-walled blank, then pressing marginal portions of the blank into homogeneity and confining the gas or vapor generating substance within the blank, and then vulcanizing the blank, substantially as specified.

3. The herein-described process of making hollow rubber bulbs or other articles having necks, projections or thickened portions, which consists in drawing through dies uncured rubber tubing having reinforcement at places forming the bulb-necks, projections or thickened portions, then cutting from said die-drawn tubing a double-walled blank, then pressing marginal portions of the blank into homogeneity, and then vulcanizing the blank, substantially as specified.

4. The herein-described process of making hollow rubber bulbs or other articles having necks, projections or thickened portions, which consists in drawing through dies uncured rubber tubing having reinforcement at places forming the bulb-necks, projections or thickened portions, then placing a gas or vapor generating substance within said tubing, then cutting from said die-drawn tubing a double-walled blank, then pressing marginal portions of the blank into homogeneity and confining the gas or vapor generating substance within the blank, and then vulcanizing the blank, substantially as specified.

5. The herein-described process of making hollow rubber bulbs or other articles having necks, projections or thickened portions, which consists in die-cutting a double-walled blank from uncured rubber tubing having reinforcement at places forming said bulb-necks, projections or thickened portions and by the blank-cutting dies pressing marginal portions of the blank into homogeneity, and then vulcanizing the blank, substantially as specified.

6. The herein-described process of making hollow rubber bulbs or other articles having necks, projections or thickened portions, which consists in placing a gas or vapor generating substance within uncured rubber tubing having reinforcement at places forming said necks, projections or thickened portions, then die-cutting a double-walled blank from said reinforced tubing and by the blank-cutting dies pressing marginal portions of the blank into homogeneity and confining the gas or vapor generating substance within the blank, and then vulcanizing the blank, substantially as specified.

7. The herein-described process of making hollow rubber bulbs or other articles having necks, projections or thickened portions, which consists in drawing through dies uncured rubber tubing having reinforcement at places forming the bulb-necks, projections or thickened portions, then die-cutting from said die-drawn tubing a double-walled blank and by the blank-cutting dies pressing marginal portions of the blank into homogeneity, and then vulcanizing the blank, substantially as specified.

8. The herein-described process of making hollow rubber bulbs or other articles having necks, projections or thickened portions, which consists in drawing through dies uncured rubber tubing having reinforcement at places forming the bulb-necks, projections or thickened portions, then placing a gas or vapor generating substance within the tubing, then die-cutting from said die-drawn tubing a double-walled blank and by the blank-cutting dies pressing marginal portions of the blank into homogeneity and confining the gas or vapor generating substance within the blank, and then vulcanizing the blank, substantially as specified.

9. The herein-described process of making hollow rubber bulbs or other articles having thickened ends, consisting in first die-drawing suitably-beaded tubing from rubber stock; second, die-cutting a walled blank from said tubing and die-pressing the marginal portions of said blank into homogeneity; and third, vulcanizing the article thus formed, substantially as specified.

IRWIN FLOYD KEPLER.

Witnesses:
  HARRY A. BAUMAN,
  WILLIAM A. MEANS.